(12) United States Patent
Ionascu

(10) Patent No.: US 11,565,558 B2
(45) Date of Patent: Jan. 31, 2023

(54) METHOD OF DETERMINING A CONFIGURATION OF A TOW LOAD CONNECTED TO A VEHICLE

(71) Applicant: JAGUAR LAND ROVER LIMITED, Warwickshire (GB)

(72) Inventor: Mihai Ionascu, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 905 days.

(21) Appl. No.: 16/468,145

(22) PCT Filed: Dec. 6, 2017

(86) PCT No.: PCT/EP2017/081654
§ 371 (c)(1),
(2) Date: Jun. 10, 2019

(87) PCT Pub. No.: WO2018/127347
PCT Pub. Date: Jul. 12, 2018

(65) Prior Publication Data
US 2021/0213791 A1  Jul. 15, 2021

(30) Foreign Application Priority Data
Jan. 9, 2017 (GB) ..................................... 1700301

(51) Int. Cl.
*B60D 1/36* (2006.01)
*B60D 1/24* (2006.01)
(Continued)

(52) U.S. Cl.
CPC .............. *B60D 1/36* (2013.01); *B60D 1/248* (2013.01); *B60R 1/003* (2013.01); *G06K 7/1417* (2013.01);
(Continued)

(58) Field of Classification Search
CPC .. B60D 1/36; B60D 1/248; B60D 1/06; B60R 1/003; G06K 7/1417; G06K 7/00;
(Continued)

(56) References Cited

U.S. PATENT DOCUMENTS 10,632,803 B2* 4/2020 Niewiadomski ......... B60D 1/36
10,800,217 B2* 10/2020 Rogan ....................... B60R 1/00
(Continued)

FOREIGN PATENT DOCUMENTS

| EP | 2602134 A1 | 6/2013 |
|---|---|---|
| GB | 2518857 A | 4/2015 |
| WO | 2016/161216 A1 | 10/2016 |

OTHER PUBLICATIONS

Combined Search and Examination Report under Sections 17 and 18(3) for Application No. GB1700301.3 dated Jun. 30, 2017.
International Search Report and Written Opinion of the International Searching Authority for International application No. PCT/EP2017/081654 dated Feb. 19, 2018.

*Primary Examiner* — Kevin Hurley
*Assistant Examiner* — Marlon A Arce
(74) *Attorney, Agent, or Firm* — Carlson, Gaskey & Olds, P.C.

(57) ABSTRACT

A method of determining the configuration of a tow load (12) coupleable to a vehicle (10), the method comprising: controlling (116) a vehicle system to obtain an indication of the presence of a unique identifier (40) mounted on the tow load (12); retrieving data (120) encoded within the unique identifier to determine the configuration of the tow load; configuring (124) the vehicle in dependence on the determined configuration of the tow load.

17 Claims, 2 Drawing Sheets

(51) Int. Cl.
    *G06K 7/14*      (2006.01)
    *B60R 1/00*      (2022.01)
    *G01S 17/931*    (2020.01)
    *G01S 15/931*    (2020.01)
    *H04N 7/18*      (2006.01)
    *B60D 1/06*      (2006.01)
    *B60Q 1/30*      (2006.01)

(52) U.S. Cl.
    CPC ............... *B60D 1/06* (2013.01); *B60Q 1/305* (2013.01); *B60W 2300/14* (2013.01); *B60W 2530/10* (2013.01); *G01S 15/931* (2013.01); *G01S 17/931* (2020.01); *G01S 2015/937* (2013.01); *H04N 7/18* (2013.01)

(58) Field of Classification Search
    CPC ............. B60Q 1/305; B60W 2300/14; B60W 2530/10; G01S 15/931; G01S 17/931; G01S 2015/937; G01S 15/86; G01S 17/86; H04N 7/18
    See application file for complete search history.

(56) References Cited

U.S. PATENT DOCUMENTS

| | | | |
|---|---|---|---|
| 2016/0075281 A1* | 3/2016 | Singh | B60G 17/015 |
| | | | 348/118 |
| 2016/0272024 A1* | 9/2016 | Bochenek | B60D 1/06 |
| 2016/0375831 A1* | 12/2016 | Wang | G06F 3/048 |
| | | | 348/148 |
| 2018/0312022 A1* | 11/2018 | Mattern | B62D 15/0285 |

* cited by examiner

METHOD OF DETERMINING A CONFIGURATION OF A TOW LOAD CONNECTED TO A VEHICLE

TECHNICAL FIELD

The present disclosure relates to a method of determining a configuration of a tow load connected to a vehicle. Aspects of the invention relate to a method, to a control system, to a vehicle, to a computer program product, and to a non-transitory computer-readable medium.

BACKGROUND

It is often useful for a vehicle to have knowledge of whether it is towing a trailer, for example to enable the vehicle to compensate for the presence of the trailer during automated manoeuvres such as obstacle detection and avoidance, or assisted parking. To avoid troubling a driver of the vehicle with indicating the presence of a trailer manually, it is desirable to detect a connected trailer automatically if possible.

Most vehicles include one or more electrical connection points to which a trailer may connect to obtain electrical power for auxiliary trailer equipment such as lighting. A conventional approach to detecting the presence of a trailer is to use a body control module (BCM) of the vehicle to apply a voltage to the electrical connection point and then measure the level of electrical power drawn from the connection. If the power drawn from the connection point exceeds a predetermined threshold, this is taken as indicative of the presence of a trailer.

It is also useful for the vehicle to have knowledge of the configuration of any items attached to the vehicle for the purposes of compensating for the presence of such items during vehicle manoeuvres. For example, when a trailer is connected to the vehicle, the type of trailer including the number of axles, the hitch length and width of the trailer may be required. The hitch length between a vehicle and a trailer may be defined as the distance between the trailer's axle and the tow hitch for a single axle trailer, or the distance between the point equidistant between the foremost and rearmost axle of a multi-axle trailer and the tow hitch. It will be appreciated that the hitch length may vary with the attitude of the trailer. For example, if the trailer nose is down, the effective pivot point moves forward through the relationship of the wheels to the load.

Currently, a vehicle may be configured with details of a particular trailer, e.g. a vehicle occupant may enter details of the trailer via the vehicle's infotainment system interface. However, confirmation of the presence of the trailer may need to be provided to the vehicle at every new ignition cycle. This may involve the driver or other vehicle occupant needing to acknowledge or interact with a notification message at each ignition cycle. Furthermore, in the event that either the preconfigured load is replaced (e.g. a different trailer) or modified (e.g. a bike rack is added to the trailer), then the preconfigured trailer details held by the vehicle will become out of date and the user will be required to go through a set up process again.

It is an aim of embodiments of the present invention to mitigate or overcome at least some of the above-mentioned problems.

SUMMARY OF THE INVENTION

Aspects and embodiments of the invention provide a method, a control system, a vehicle, a computer program product, and a non-transitory computer-readable medium as claimed in the appended claims.

According to an aspect of the present invention there is provided a method of determining the configuration of a tow load coupleable to a vehicle, the method comprising: controlling a vehicle system to obtain an indication of the presence of a unique identifier mounted on the tow load; retrieving data encoded within the unique identifier to determine the configuration of the tow load; configuring the vehicle in dependence on the determined configuration of the tow load.

The present invention provides a method in which a unique identifier, containing details of the tow load, is mounted upon the tow load. The unique identifier may be read to recover data encoded therein which specifies the configuration of the tow load. In this manner the details of the tow load which is coupleable to the vehicle can be passed to a vehicle control system such that the vehicle can be appropriate configured. It is noted that the present invention may operate when the tow load is coupled (attached) to the vehicle and/or may operate when the tow load is being brought up for attachment to the vehicle. In the latter example the vehicle may be configured to facilitate hitching of the tow load to the vehicle, for example by automatically altering the height of a vehicle's air suspension system following retrieval of data encoded in the unique identifier, as the tow load is brought up for attachment to the vehicle.

Optionally, the vehicle system is an imaging system and optionally the imaging system comprises a camera. Optionally, the imaging system is a camera. Optionally, the unique identifier is a QR code. Optionally, retrieving data comprises decoding the data stored in the unique identifier to recover configuration of the tow load.

Optionally, retrieving data comprises decoding the data stored in the unique identifier to recover a load ID reference. Optionally, decoding the data stored in the unique identifier comprises identifying an association between the load ID reference and the configuration of the tow load. Optionally, the configuration of the tow load is stored in a data store on the vehicle and the method comprises looking up the configuration in the vehicle data store. Optionally, the configuration of the tow load is stored remotely from the vehicle in a remote data store and the method further comprises sending a request to the remote data store for the configuration of the tow load.

Optionally, the method comprises a configuration step in which the unique identifier is associated with the configuration of the tow load and the configuration and association is stored in a data store. The unique identifier may be generated as part of the configuration step or a pre-existing unique identifier may be used.

Optionally, information relating to the configuration of the tow load comprises one or more selected from: at least one dimension of the tow load; a plurality of dimensions of the tow load, a weight of the tow load; a number of axles of the tow load.

Optionally, the method comprises determining the presence of a tow load attached to the vehicle and (optionally subsequently) controlling the vehicle system to determine the presence of a unique identifier.

According to a further aspect of the present invention there is provided a vehicle control system for determining the configuration of a tow load coupleable to a vehicle, the control system comprising: a controller configured to control a vehicle system to obtain an indication of the presence of a unique identifier mounted on the tow load; an input configured to receive the indication; a processor arranged to retrieve data encoded within the unique identifier to determine the configuration of the tow load and; an output arranged to output a configuration signal to configure the vehicle in dependence on the determined configuration of the tow load.

Optionally, the vehicle control system comprises an imaging system and optionally the imaging system comprises a camera. Optionally, the imaging system is a camera.

Optionally, the unique identifier is a QR code. Optionally, the processor is arranged to retrieve data by decoding the data encoded within the unique identifier to recover the configuration of the tow load.

Optionally, the processor is arranged to decode the data encoded within the unique identifier to recover a load ID reference. Optionally, the configuration of the tow load is stored in a data store on the vehicle and the processor is arranged to retrieve the configuration from the vehicle data store. Optionally, the configuration of the tow load is stored remotely from the vehicle in a remote data store and the processor is arranged to send a request to the remote data store to retrieve the configuration of the tow load. Optionally, the processor is arranged to search for and identify an association between the load ID reference and the configuration of the tow load stored in the data store on the vehicle or remotely therefrom. As part of a configuration step, the processor is optionally arranged to associate the unique identifier with the configuration of the tow load (to form an association there-between) and to store the configuration and the association in a or the data store on the vehicle or remotely therefrom.

Optionally, information relating to the configuration of the tow load comprises one or more selected from: at least one dimension of the tow load; a plurality of dimensions of the tow load, a weight of the tow load; a number of axles of the tow load.

Optionally, the processor is arranged to determine the presence of a tow load attached to the vehicle and (optionally subsequently) to control the imaging system to determine the presence of a unique identifier.

An electronic memory device having instructions stored therein may be electrically coupled to the processor, the processor being configured to access the memory device and to execute the instructions stored therein such that it is operable to determine the level of confidence that a trailer is present.

The invention further extends to a vehicle comprising such a control system, and to a vehicle or vehicle control system configured to perform the methods of the above aspects. Further aspects of the invention provide a computer program product comprising computer readable code for controlling a computing device to perform the methods of the above aspects, and to a non-transitory computer readable medium comprising such a computer program product.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
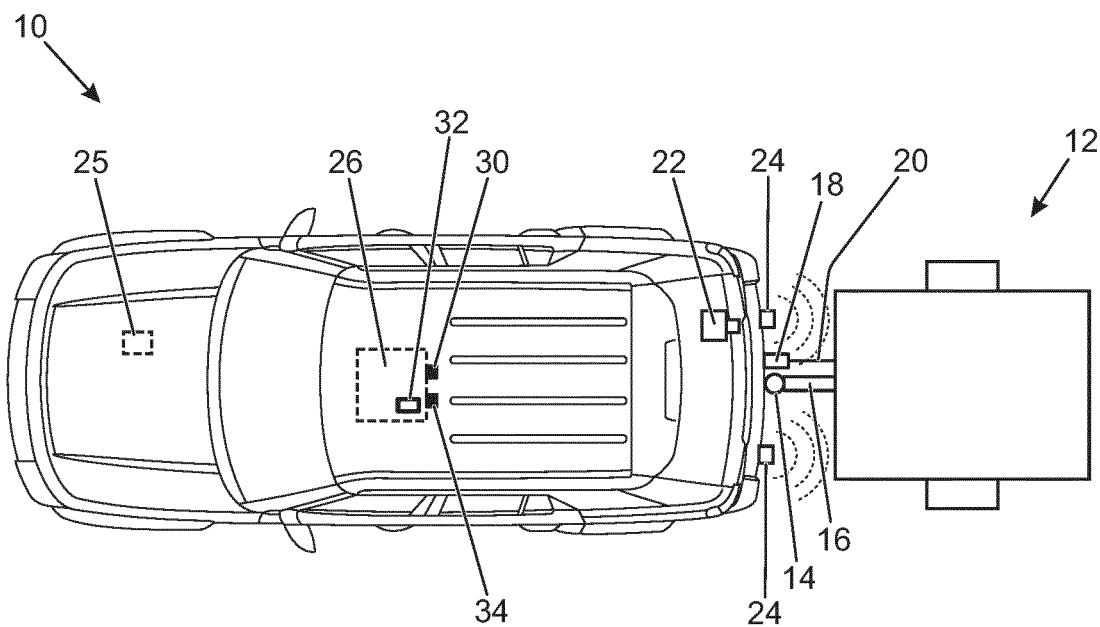
FIG. 1 is a schematic plan view of a vehicle-trailer combination that is suitable for use with embodiments of the invention.

FIG. 1 shows a vehicle 10 towing a standard two-wheel trailer 12 (the "tow load"), to set the invention in context. It is noted however that the tow load may encompass a range of loads such as a standard two-wheel trailer, a multi-axle trailer, caravan, bike rack etc. or any other load that may be mounted to the tow hitch of a vehicle.

The trailer 12 is attached to a tow-ball 14 of the vehicle 10 by way of a rigid tow-bar 16, which holds the trailer 12 at a constant distance behind the vehicle 10, as is conventional. The tow-bar 16 is able to pivot around the tow-ball 14, allowing the trailer 12 to yaw with respect to the vehicle 10, for example as the vehicle-trailer combination traverses a bend.

A terminal defining an electrical connection point 18 is disposed at the rear of the vehicle 10, to which an electrical cable 20 extending from the trailer 12 connects. Electrical power is delivered from a battery (not shown) of the vehicle 10 through the electrical connection point 18 and the electrical cable 20 to power electrical systems included on the trailer 12. In particular, these systems include lighting at the rear of the trailer that replaces the functionality of rear lights of the vehicle 10, which are obscured by the trailer 12.

Also residing on the vehicle 10 are a rear-mounted camera 22 that is used for assisting parking manoeuvres, and a pair of rearward-facing parking sensors 24 associated with a parking distance control (PDC) system, the parking sensors 24 being spaced from one another and disposed to each side of the tow-ball 14. It is noted that in practice there would typically be more than two parking sensors present on the rear of the vehicle 10, but for simplicity only two are shown in FIG. 1. The parking sensors 24 may be ultrasonic sensors, for example, or other forms of proximity sensing may be used such as laser sensors or LIDAR. An electronic control unit (ECU) 25 for controlling various vehicle functions is shown.

DC electrical power is supplied to the trailer 12 through the electrical connection point 18 under the control of a body control module (BCM) 26. The BCM 26 is an electronic control unit that is responsible for controlling various electronic systems within the vehicle 10, including electric windows, air conditioning, and a range of other systems.

A primary indication of the presence of a trailer 12 is provided in the conventional manner described above, by operating the BCM 26 to apply a DC voltage at the electrical connection point 18, to measure the magnitude of electrical current drawn from the connection point 18, and to check whether the current magnitude exceeds a pre-determined threshold. The BCM 26 comprises an input 30 for receiving signals, a processor 32 for determining trailer 12 details and an output 34 for outputting control signals.

The rear-mounted camera 22 captures images of a scene directly behind the vehicle 10. Such images may be relayed to a display within the vehicle 10 to guide a driver while reversing the vehicle 10, for example. To provide a secondary indication of the presence of a trailer 12, the rear-mounted camera 22 can be activated to capture images at other times, and those images can be analysed using image-recognition algorithms to identify the presence of an object within them that is likely to be a trailer 12. Typically, the rear-mounted camera would be activated in this manner when the vehicle 10 is initially started, to provide knowledge of the presence of a trailer 12 from the outset.

Figure 2:
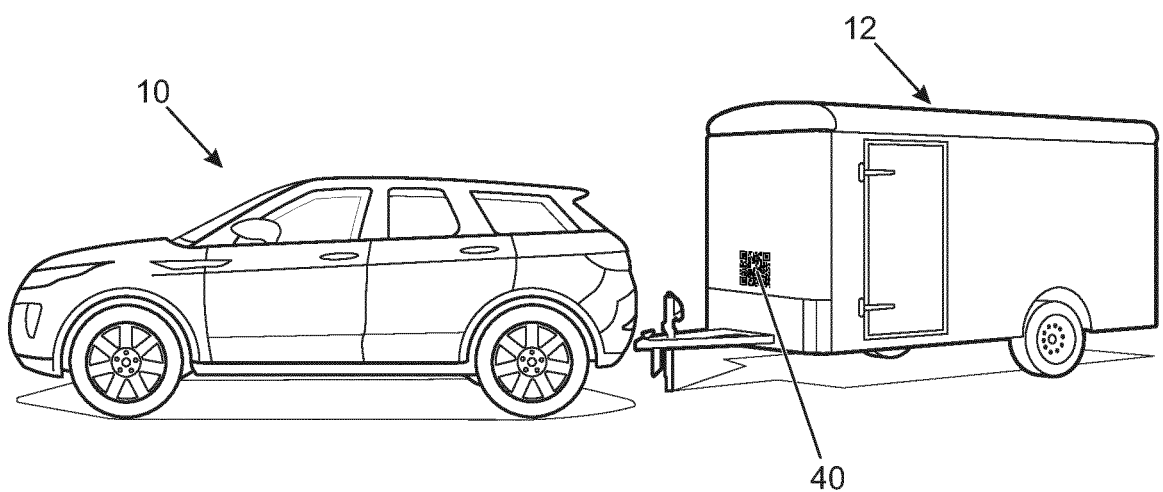
FIG. 2 shows a vehicle-trailer combination for use with embodiments of the invention.

FIG. 2 shows a vehicle 10 and trailer 12 in accordance with an embodiment of the present invention in which the trailer 12 is provided with a unique identifier 40, in the form of a QR code, which is affixed or otherwise mounted to the front of the tow load 12. The unique identifier 40 may be read by the rear-mounted camera 22 on the vehicle and the information contained therein may be decoded within the camera 22, within the ECU 25 or by the body control module 26. In the event that the information within the unique identifier 40 is decoded within the ECU 25 or camera 22, the decoded information may be provided to the BCM 26. Further, in such arrangements the camera 22 and ECU 25 are regarded as comprising a suitable input 30, processor 32 and output 34 for performing embodiments of the present invention.

The unique identifier 40 may encode a simple load ID reference or may encode specific details about the configuration of the tow load object, e.g. its weight, dimensions, number of axles etc.

In the event that the identifier 40 encodes a load ID reference, the configuration information relating to the tow load object may be retrieved from a data store (either located on the vehicle 10 or remotely).

It is noted that the camera 22 may comprise a fish eye lens and so the dimensions of the unique identifier 40 may be defined based on the identifier type (e.g. QR code/barcode/ special graphics), required error correction parameters, camera resolution, camera lens and distance from the camera.

Figure 3:
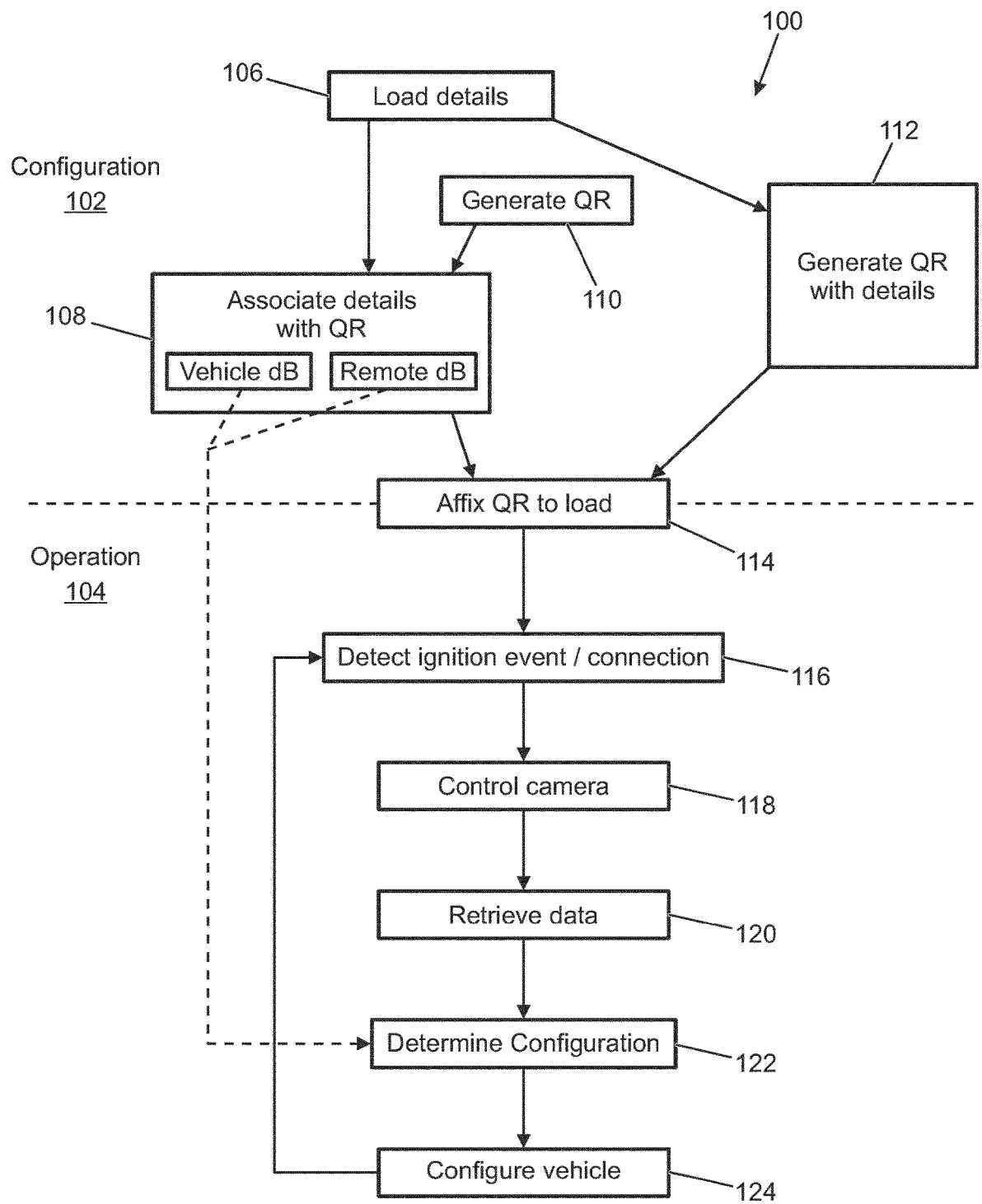
FIG. 3 is a flow diagram showing a process for determining the vehicle towbar configuration according to an embodiment of the invention.

FIG. 3 shows a process 100 for determining the configuration of a tow load attached to a vehicle 10. The process 100 comprises a configuration phase 102 and an operation phase 104. Once a particular unique identifier 40 has been configured in the configuration phase 102 then the vehicle 10 may operate according to the operation phase 104 steps as described below.

The configuration phase 102 begins at step 106 by either the vehicle owner or a third party entering configuration details of a tow load 12 into a computer system.

Depending on whether a pre-generated unique identifier 40 is being used or a bespoke identifier is being generated the configuration phase 102 may then follow one of three options.

In the first option a pre-generated unique identifier 40 containing a reference ID is used and, in step 108, an association is made between the configuration details entered in step 108 and the pre-generated identifier 40. The configuration details are then stored in a database along with the association to the identifier 40.

The database may comprise a data store on the vehicle 10 or alternatively a remote data store that may be updated over a communications network.

In the second option a unique identifier 40 is generated in step 110 which contains a reference ID only. The generated identifier 40 may then be associated with the tow load configuration details in a similar manner to step 108 as described above.

In the third option a unique identifier 40 is generated in step 112 which contains the tow load configuration details.

Following either step 108 or 112 the unique identifier 40 is affixed to the tow load in step 114.

In step 116 the body control unit 26 is arranged to either detect an ignition event (such as vehicle start), receive a tow load connection notification in response to a tow load being connected to the vehicle or receive a user input confirming that a tow load has been connected to the vehicle.

In step 118, the BCM 26 controls the camera 22 to scan for/capture the presence of a unique identifier 40 affixed to the tow load 12.

In step 120, the BCM 26 is arranged to retrieve data encoded within the unique identifier and in step 122 the BCM 26 is arranged to determine the configuration settings of the tow load. It is noted that in the embodiment of FIG. 3 the BCM 26 decodes the unique identifier information. However, as noted above, the decoding may take place elsewhere, such as the camera 22 or the ECU 25, and the BCM 26 may be arranged to receive the decoded information and/or receive the details of the vehicle tow load.

It is noted that depending on the configuration option used the BCM 26 may determine the configuration details of the tow load either directly from the retrieved data or from a data store.

In the event that the unique identifier 40 encodes a reference ID only then the BCM 26 may query a data store (either local to the vehicle or remotely located) to retrieve the configuration details of the tow load (that were stored in step 108).

In the event that the unique identifier 40 encodes all the tow load configuration details then in step 122 the encoded data may be processed to decode the configuration information.

In step 124 the vehicle may be configured by the BCM 26 in dependence on the tow load configuration details. Such vehicle configuration may comprise changes to RPM, changes to acceleration, changes to a pedal-to-wheel torque relationship and/or gear changes.

Following step 124 the BCM 26 may return to step 116 to await a new ignition cycle or a further indication that a tow load has been connected to the vehicle.

For purposes of this disclosure, it is to be understood that the control system described herein can comprise a controller, an electronic control unit (ECU) or computational device having one or more electronic processors. A vehicle and/or a system thereof may comprise a single electronic control unit or electronic controller or alternatively different functions may be embodied in, or hosted in, different electronic control units or controllers. A set of instructions could be provided which, when executed, cause said controllers or electronic control units to implement the control techniques described herein, including the described methods. The set of instructions may be embedded in one or more electronic processors, or alternatively, the set of instructions could be provided as software to be executed by one or more electronic processors. For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

At least some of the blocks illustrated in FIG. 3 may represent steps in a method and/or sections of code in a computer program. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features, whether described or not.

Although features have been described with reference to certain embodiments, those features may also be present in other embodiments whether described or not.

Whilst endeavoring in the foregoing specification to draw attention to those features of the invention believed to be of particular importance, it should be understood that the Applicant claims protection in respect of any patentable feature or combination of features hereinbefore referred to and/or shown in the drawings, whether or not particular emphasis has been placed thereon.

The invention claimed is:

1. A method of determining a configuration of a tow load coupleable to a vehicle, the method comprising:
   controlling a vehicle system to obtain an indication of a presence of a unique identifier mounted on the tow load;
   retrieving data encoded within the unique identifier and decoding the data encoded within the unique identifier to recover a load identification reference and to determine the configuration of the tow load;
   storing the determined configuration of the tow load remotely from the vehicle in a remote data store;
   sending a request to the remote data store to retrieve the determined configuration of the tow load; and
   configuring the vehicle in dependence on the determined configuration of the tow load.

2. The method as claimed in claim 1, wherein the vehicle system comprises an imaging system comprising a camera.

3. The method as claimed in claim 1, wherein retrieving data comprises decoding the data encoded within the unique identifier to recover the configuration of the tow load.

4. The method as claimed in claim 1, comprising a configuration step including associating the unique identifier with the configuration of the tow load and storing the associated configuration and association in the remote data store or a data store on the vehicle.

5. The method as claimed in claim 4, comprising generating the unique identifier as part of the configuration step.

6. The method as claimed in claim 4, comprising using a pre-existing unique identifier as part of the configuration step.

7. The method as claimed in claim 1, wherein information relating to the configuration of the tow load comprises one or more selected from: at least one dimension of the tow load, a weight of the tow load, and a number of axles of the tow load.

8. The method as claimed in claim 1, comprising determining the presence of the tow load attached to the vehicle and controlling the vehicle system to determine the presence of the unique identifier.

9. A vehicle control system for determining the configuration of a tow load coupleable to a vehicle, the control system comprising:
   a controller configured to control a vehicle system to obtain an indication of the presence of a unique identifier mounted on the tow load;
   a processor arranged to retrieve data encoded within the unique identifier to determine the configuration of the tow load; and
   an output arranged to output a configuration signal to configure the vehicle in dependence on the determined configuration of the tow load,
   wherein the processor is arranged to decode the data encoded within the unique identifier to recover a load identification reference, and
   wherein the configuration of the tow load is stored remotely from the vehicle in a remote data store and the processor is arranged to send a request to the remote data store to retrieve the configuration of the tow load.

10. The system as claimed in claim 9, wherein the vehicle system comprises an imaging system.

11. The system as claimed in claim 10, wherein the imaging system comprises a camera.

12. The system as claimed in claim 9, wherein the unique identifier is a quick response code.

13. The system as claimed in claim 9, wherein the processor is arranged to retrieve data by decoding the data encoded within the unique identifier to recover the configuration of the tow load.

14. The system as claimed in claim 9, wherein the configuration of the tow load is also stored in a data store on the vehicle and the processor is further arranged to retrieve the configuration from the data store on the vehicle.

15. The system as claimed in claim 9, wherein the processor is arranged to associate the unique identifier with the configuration of the tow load and to store the configuration and association in the remote data store or a data store on the vehicle.

16. A vehicle comprising the control system of claim 9.

17. A non-transitory, computer-readable storage medium storing instructions thereon that when executed by one or more processors causes the one or more processors to carry out the method of claim 1.

* * * * *